(12) United States Patent
Williams et al.

(10) Patent No.: US 11,770,885 B2
(45) Date of Patent: Sep. 26, 2023

(54) APPARATUS HAVING AT LEAST ONE LED STRING CONTROLLED BY A CURRENT CONTROLLER BIASED BY VOLTAGE-TAP NODES IN THE LED STRING

(71) Applicant: FLUENCE BIOENGINEERING, INC., Austin, TX (US)

(72) Inventors: Jonathan Williams, Austin, TX (US); Jose Garcia, Austin, TX (US); Guruprakash Iyer, Austin, TX (US)

(73) Assignee: FLUENCE BIOENGINEERING, INC., Austin, TX (US)

( * ) Notice: Subject to any disclaimer, the term of this patent is extended or adjusted under 35 U.S.C. 154(b) by 0 days.

(21) Appl. No.: 17/079,774

(22) Filed: Oct. 26, 2020

(65) Prior Publication Data

US 2022/0132637 A1 Apr. 28, 2022

(51) Int. Cl.
| | |
|---|---|
| *H05B 45/345* | (2020.01) |
| *H05B 45/48* | (2020.01) |
| *H05B 45/10* | (2020.01) |
| *H05B 47/19* | (2020.01) |
| *H02J 50/10* | (2016.01) |
| *F21S 9/02* | (2006.01) |

(52) U.S. Cl.
CPC .......... *H05B 45/345* (2020.01); *H05B 45/10* (2020.01); *H05B 45/48* (2020.01); *H05B 47/19* (2020.01); *F21S 9/02* (2013.01); *H02J 50/10* (2016.02)

(58) Field of Classification Search
CPC .......... H04W 4/50; H04W 4/70; H04W 4/80; H04W 76/10; H04W 76/14; H04W 84/12; H04W 88/02; H04W 88/06; H05B 45/10; H05B 45/395; H05B 45/44; H05B 31/50; H05B 45/12; H05B 45/18; H05B 45/3725; H05B 45/375; H05B 45/385; H05B 47/175; H05B 45/37; H05B 47/105; H05B 45/20; H05B 47/16; F21S 2/00; F21K 9/232; F21K 9/235; F21K 9/238; F21K 9/65; F21K 9/68; F21K 9/69; F21K 9/27
See application file for complete search history.

(56) References Cited

U.S. PATENT DOCUMENTS

| | | | | |
|---|---|---|---|---|
| 6,329,139 | B1* | 12/2001 | Nova | B01L 3/50255 |
| | | | | 506/40 |
| 8,937,440 | B2* | 1/2015 | Xu | H05B 45/35 |
| | | | | 315/297 |
| 9,402,288 | B2* | 7/2016 | Xu | H05B 45/37 |
| 10,667,362 | B1* | 5/2020 | Coetzee | H05B 45/39 |
| 2019/0098725 | A1* | 3/2019 | Sadwick | F21S 2/00 |
| 2019/0154439 | A1* | 5/2019 | Binder | G01S 13/878 |

* cited by examiner

*Primary Examiner* — Monica C King

(57) ABSTRACT

Apparatuses of various forms and each having at least one LED string controlled by a current controller biased by voltage tap nodes in the LED string, and circuitry for implementing the same. In some implementations, circuitry made in accordance with the present disclosure includes a current controller and current-control circuitry. The current controller is biased by a voltage drop across one or more LEDs in an LED string and controls the current-control circuitry in a manner that controls the electrical current in the LED string. In some implementations, one or more additional LED strings and/or one or more other devices may be controlled directly or indirectly by operation of the current controller.

16 Claims, 9 Drawing Sheets

APPARATUS HAVING AT LEAST ONE LED STRING CONTROLLED BY A CURRENT CONTROLLER BIASED BY VOLTAGE-TAP NODES IN THE LED STRING

FIELD OF THE DISCLOSURE

The present disclosure generally relates to the field of power control of strings of light-emitting diodes (LEDs). In particular, the present disclosure is directed to an apparatus having at least one LED string controlled by a current controller biased by voltage tap nodes in the LED string.

BACKGROUND

Strings of light-emitting diodes (LEDs) are used in many applications. For example, LED-based lighting devices are used for many different applications, including, among others, growing plants indoors to simulate various spectral qualities of natural sunlight that the plants have evolved to be responsive to. Engineers are continually seeking ways to make these LED-based lighting devices less expensive and more robust.

SUMMARY OF THE DISCLOSURE

In one implementation, the present disclosure is directed to an apparatus. The apparatus includes a first light-emitting diode (LED) string that includes a first plurality of LED packages connected in electrical series with one another, current-control circuitry operatively connected to the first LED string so as to control an electrical current in the first LED string, and a current controller operatively connected to the current-control circuitry and using a bias voltage for operation, in which the current controller is operatively configured to cause the current-control circuitry to control the electrical current, and the current controller is electrically connected to bias-voltage tap nodes in the first LED string so as to provide the bias voltage, the bias-voltage tap nodes having one or more of the first plurality of LED packages located therebetween so that the bias voltage is provided by a voltage drop across the one or more of the LEDs located between the bias-voltage tap nodes.

In some implementations, during operation, the LED string has a higher-voltage end and a lower-voltage end, the first plurality of LED packages includes at least a first LED package located at the higher-voltage end and at least one second LED package electrically located downstream of the first LED package, and the bias-voltage tap nodes tap into the LED string are located on opposite side of the second LED package. In some implementations, the current-control circuitry controls the electrical current in the LED string at a location in the LED string closer to the lower-voltage end than the bias-voltage tap nodes. In some implementations, the current-control circuitry controls the electrical current in the LED string at a location in the LED string closer to the higher-voltage end than the bias-voltage tap nodes.

In some implementations, the current-control circuitry includes a linear current controller that controls the electrical current in the first LED string. In some implementations, the current-control circuitry includes a switching current controller that controls the electrical current in the first LED string. In some implementations, the current controller includes a current sensor that senses the electrical current in the first LED string. In some implementations, the current controller includes a current-sense op-amp. In some implementations, the apparatus further includes a housing that contains first LED string, the current-control circuitry, and the current controller. In some implementations, the apparatus further includes a power supply electrically coupled to the first LED string for powering the first LED string and integrated into the housing.

In some implementations, the apparatus further includes a second LED string powered by the first LED string. In some implementations, during operation, the LED string has a higher voltage end and a lower-voltage end, and the second LED string is electrically connected to biasing nodes within the first LED string. In some implementations, the second LED string is powered by an inductive coupling to the first LED string. In some implementations, the first LED string has a first spectral content and the second LED string has a second spectral content different from the first spectral content of the first LED string, and circuitry of the apparatus is configured so that changes to the electrical current in the first LED string caused by the current controller changes an electrical current in the second LED string so as to change a mix of the first and second spectral contents output by the apparatus. In some implementations, the change of the mix includes a change in near-red output and far-red output.

In some implementations, the first LED string includes an inductive winding in electrical series with the first plurality of LED packages, the apparatus further including one or more electrical loads inductively coupled to the inductive winding so as to power the one or more electrical loads. In some implementations, the one or more electrical loads includes at least one of a second LED string, a control circuit, an energy storage device, and a radio. In some implementations, the one or more electrical loads includes a second LED string, a dimmer circuit, and a wired or wireless housekeeping control circuit. In some implementations, the apparatus is configured to illuminate one or more plants. In some implementations, the apparatus further includes a radio configured to wirelessly communicate with a remote controller.

BRIEF DESCRIPTION OF THE DRAWINGS

For the purpose of illustrating the disclosure, the drawings show aspects of one or more implementations of the disclosure. However, it should be understood that the present disclosure is not limited to the precise arrangements and instrumentalities shown in the drawings, in which.

DETAILED DESCRIPTION

Figure 1:
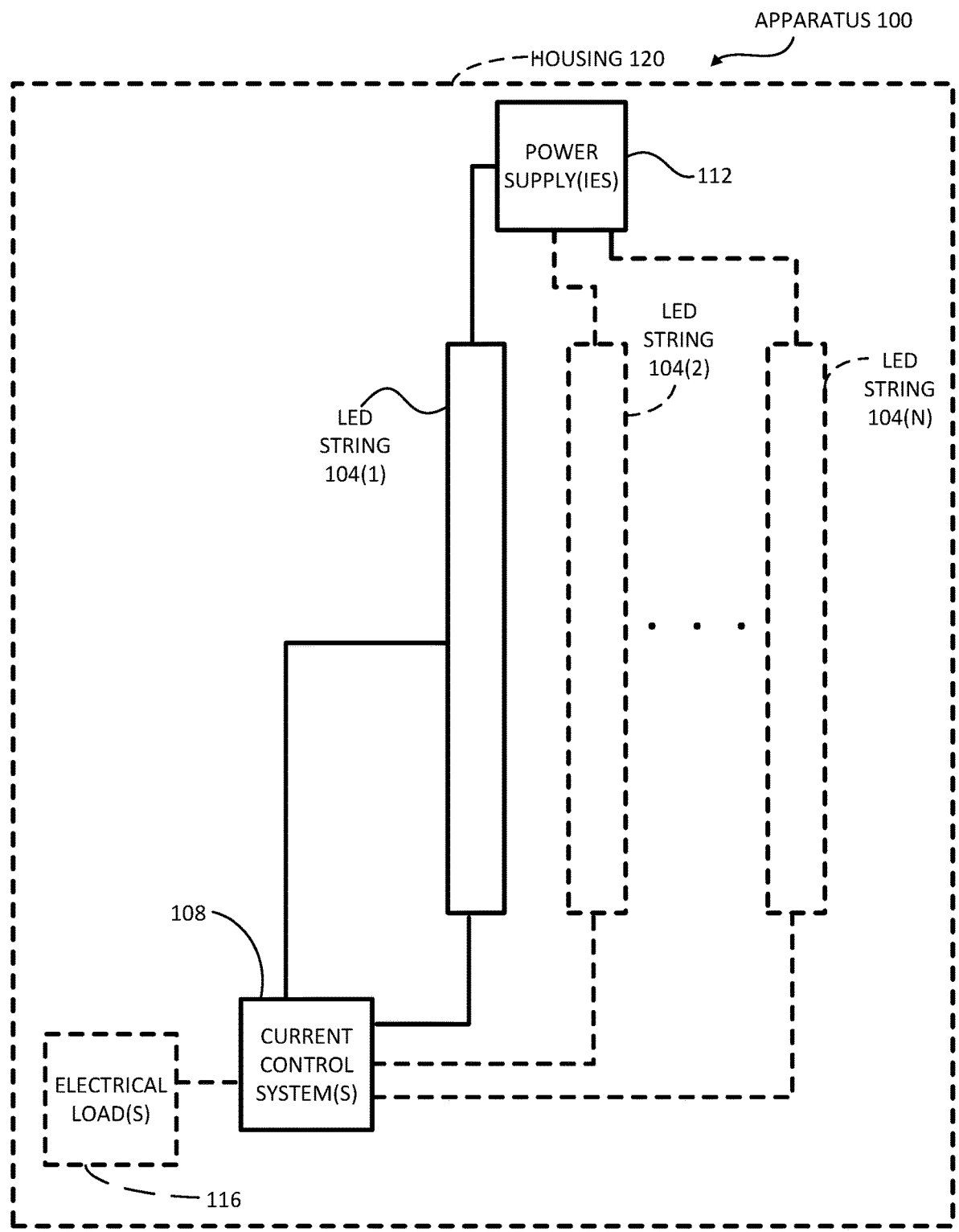
FIG. 1 is a high-level diagram of an apparatus containing at least one LED string and a current-control system biased using bias-voltage taps within an LED string of the at least one LED string in accordance with various implementations.

In some aspects, the present disclosure is directed to apparatuses, such as luminaires, artificial-sunlight devices, and accent-lighting devices, among others, having at least one light-emitting diode (LED) string controlled using a current-control system configured to operate using a bias voltage obtained via bias-voltage tap nodes in the LED string located to take advantage of a forward voltage drop across the bias-voltage tap nodes. These bias-voltage tap nodes can be located electrically across one or more LED packages within the LED string. This approach uses the forward voltage drop of the one or more LED packages in the LED string to generate the bias voltages and currents for operating the current-control system and to provide the operating current by "stealing" a small percentage of current from one or more of the LED packages in the LED string. In some implementations, switching elements for controlling current in the LED string are in electrical series with the LED string and only need to operate at a high enough voltage to control that current. The reduction in switching element input voltage in such implementations helps reduce the C*V losses and allows use of parts, such as op-amps, reference voltage/op-amp combinations, MOSFETs, switching-type current controllers, etc., produced in high volume with integrated components to reduce part count and cost and to establish high reliability. The bias-voltage tap nodes in the LED string allow the use of simple regulation without the power loss that is conventionally present when power is tapped from the main power supply for providing voltage rails for control. The internal (relative to the LED string) bias-voltage tap nodes of the present disclosure also allow the current-control system to operate while the voltage input to the switching elements is below the operating voltage for the control circuit.

Additional benefits of using internal bias-voltage tap nodes of the present disclosure include, but are not limited to:

The power supply needed to supply internal bias voltages may be eliminated. The current-control system no longer needs to withstand the full input voltage of the power supply at steady-state operation. If used with a switching element in series with the LED string, it eliminates the problem of the switching element lowering the available voltage potential below the value needed for supply.

Low cost components can be used while still providing light output over all but the lowest operating points when the power supply for the control is not dependent on the impedance limiting the current through the LED string for the preferred operating range.

The current path around the switching component or linear regulator allows the use of low-cost, high-volume reliable components. When bias-voltage tap nodes internal to the LED string are used to implement control for the switching component or linear regulator, the operation of the control is independent from the switching component operation. The LED string can be operated at a lower current than this threshold until the current for the control is reached. At that point, LEDs below the bias-voltage tap flash on and off unless hysteresis control is implemented with care for degradation of the capacitance or increase of leakage over time. In some implementations, this flashing may be implemented as a visual indication, for example, that the current-control system is working, that fault diagnosis is needed, and/or for commissioning of a corresponding lamp or other device.

Ability to add a coupled winding to the inductor to provide control to a second LED string.

Ability to shunt a coupled winding to reflect an impedance to the primary in order to realize power savings at a lower cost of implementation and/or control which winding(s) receive more current.

Ability to exercise control of the secondary shunt in conjunction with operation of the main converter.

Ability to use the coupled winding to provide power to other circuitry, such as sensors, and/or an on-board wireless module embedded in the fixture, thereby eliminating the need for expensive wireless module housings and associated power and the need for a dedicated power supply for the wireless control scheme.

As used herein, the term "LED string" and like terms refers to a plurality (2 or more) LED packages electrically connected in series or in series-parallel with one another. For simplicity, as used herein and in the appended claims, any reference to an LED string being series-connected, i.e., having a plurality of LED packages and/or a plurality of LEDs electrically connected in series with one another, includes LED packages and/or LEDs electrically connected in series-parallel unless a series-parallel electrical connection is explicitly excluded. An "LED package" is a discrete assembly containing any number of LEDs, lens(es), packaging, and terminals (e.g., contacts, pins, wires, or other conductors) for electrically connecting the LED package to circuitry for powering the LED package. Such power-providing circuitry may be provided by a printed circuit board, a backplane, wiring, or other macro-scale circuitry, into which the LED package may be integrated. For convenience, the term "LED" as used herein and in the appended claims can mean either an "LED package" or an individual light-emitting diode, depending on the context of the usage or unless a particular meaning is explicitly excluded. Apparatuses that include a current-control system biased internally relative to an LED string can have any of a wide variety of circuitry for implementing the current-control system. In addition, the circuitry controlled by the current-control system can have any of many differing configurations. Examples of these circuitries are described below. In some implementations, the present disclosure is directed to one or more components of an apparatus of this disclosure, such as, for example, circuits and circuitry described herein in connection with FIGS. 2 through 8D.

Before turning to some example circuits, FIG. 1 illustrates an example apparatus 100 in which circuits and/or circuitry configured in accordance with the present disclosure may be incorporated. The apparatus 100 includes one or more LED strings 104(1) to 104(N) and one or more current-control systems 108 (only one shown for convenience). The current-control system 108 is electrically connected to at least a first one of the LED strings (here, first LED string 104(1)) so as to be electrically biased via the first LED string and is also operatively connected to the first LED string so as to control an electrical current through the first LED string. The apparatus 100 includes at least one power supply 112 electrically connected across at least the first LED string 104(1) to power the first LED string and any circuitry powered internally relative to the first LED string, such as circuitry of the current-control system 108. If additional LED strings 104(2) to 104(N) are provided, each may be powered in any suitable manner, such as directly by the same power supply 112 that powers the first LED string 104(1), by power obtained by a voltage drop internal to the first LED string, by inductive coupling to the first LED string, or by a power supply (not shown) different from the power supply powering the first LED string, among others. In some implementations, one or more optional electrical loads 116 other than one or more additional LED strings 104(2) to 104(N) may alternatively or additionally each obtain power from internally to the first LED string 104(1), such as by inductive coupling or a voltage bias across electrical nodes within the first LED string. Examples of other loads that each electrical load 116 may be include but are not limited to radios, dimmer circuitry, and energy storage devices, among others.

In some implementations, all components of the apparatus 100, i.e., the power supply(ies) 112, the LED string(s) 104, and the current-control system(s) 108, and any optional other electrical load(s) 116 that may be present, are incorporated into an optional housing 120 to provide a discrete device. In some implementations, some of the components, for example, all of the components other than the power supply(ies) 112 may be integrated into a single housing (not shown), with the power supply(ies) being located externally to the housing. In some implementations, some of the components may integrated into multiple separate housings (not shown) that may be connected together. For example, each housing may include one or more LED strings 104, one or more current-control systems 108, and one or more optional other electrical loads 116 to form discrete devices, with one or more power supplies 112 being located externally to the multiple housings, for example, integrated into a discrete housing of its/their own. In this example, each of the multiple devices may be electrically connected to the power supply(ies) via suitable electrical cables. The physical configuration of the apparatus can be virtually any physical configuration desired as long as the fundamental current-control principles disclosed herein are implemented. Examples of electrical circuits that can be used in apparatus 100 or other apparatuses are described below. Those skilled in the art will understand that these examples are merely illustrative and that many other electrical circuits implementing fundamental current-control principles of the present disclosure can be made without undue experimentation based on an understanding of these principles from the current disclosure.

Figure 2:
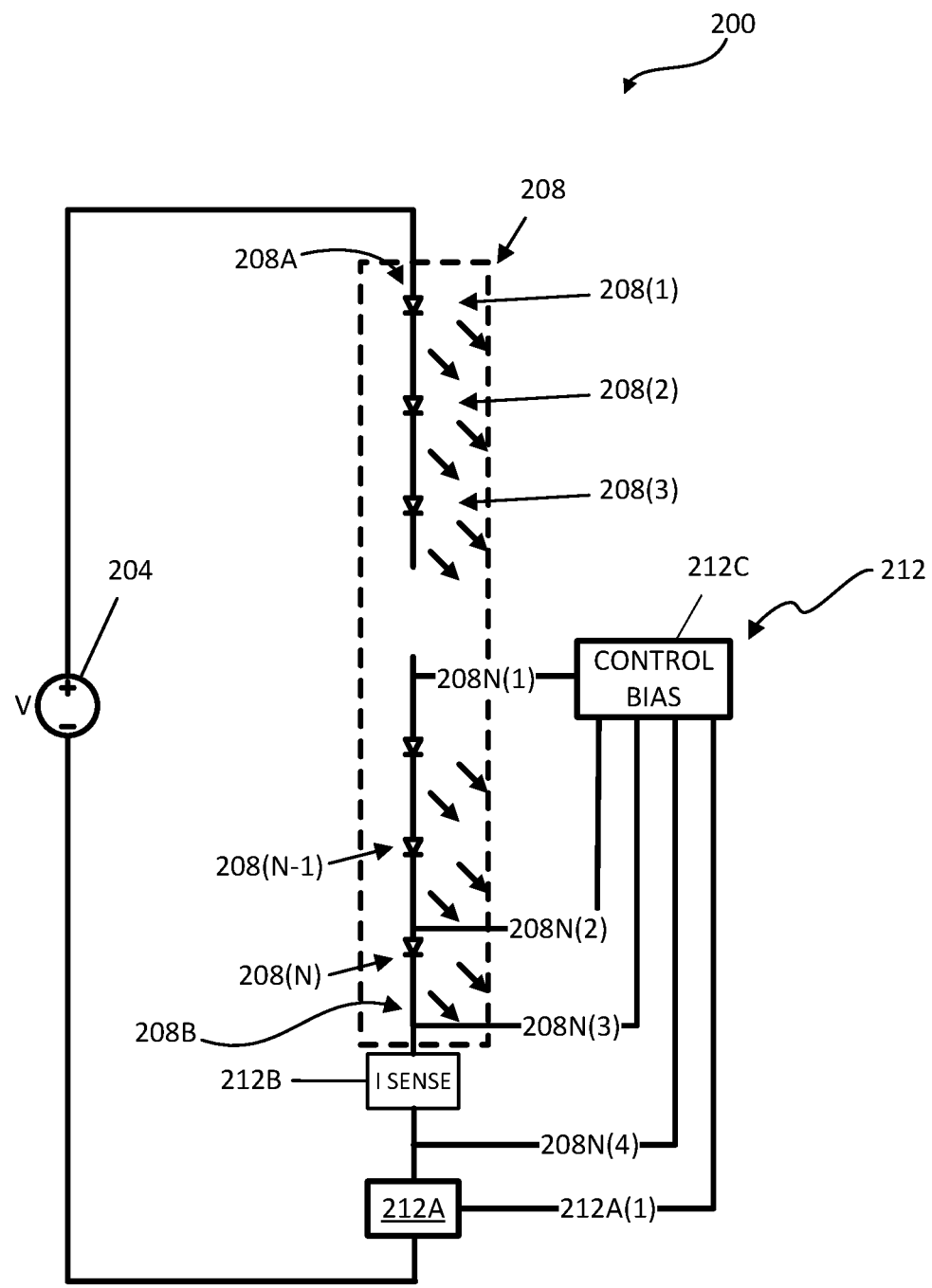
FIG. 2 is a circuit diagram illustrating an example electrical circuit that can be used in the apparatus of FIG. 1, in which electrical current in the LED string is controlled using a linear current controller in accordance with various implementations.

FIG. 2 illustrates and example circuit 200 that can be use in any suitable apparatus, such as, for example, the apparatus 100 of FIG. 1. Referring to FIG. 2, the circuit 200 includes a power supply 204 and an LED string 208 driven by the power supply. In this example, the power supply 204 is a constant-voltage power supply. In other implementations, the power supply 204 can be of a type other than a constant-voltage power supply, such as a variable-voltage power supply, a constant-current power supply, or a power supply having a current setpoint with voltage and power limits, among others. The LED string 208 has a higher-voltage end 208A, a lower-voltage end 208B, and a plurality of LED packages 208(1) to 208(N) (only some labeled to avoid clutter) electrically connected in series with one another between the higher- and lower-voltage ends of the LED string. Each of the LED packages 208(1) to 208(N) may be any LED package suitable for the application of the circuit 200. Fundamentally, there is no limitation on the type of the LED packages 208(1) to 208(N).

In accordance with the present disclosure, the circuit 200 include a current-control system 212 for controlling the level of electrical current in the LED string 208. In this example, the current-control system 212 includes current-control circuitry 212A, current-sense circuitry 212B, and a current controller 212C. The current-control circuitry 212A includes circuitry for controlling the current, such as a linear regulator (or linear current controller) (shown) or a switching current controller. In one example, the current-control circuitry 212A includes a MOSFET-based linear current controller. The current-control circuitry 212A may be placed at any suitable location within the LED string 208 where the electrical current is to be controlled and any thermal considerations require. In some implementations, it can be beneficial to heat-sink the current-control circuitry 212A as part of a thermal management plan for the circuit 200. If a component used to implement any circuitry of the present disclosure, such as the current-control circuitry 212A, has built-in thermal protection, that protection can be leveraged to place that component in a hot spot near a bias-voltage tap node, such as bias-voltage tap nodes 208N(1) and 208N(2). This arrangement can provide a gross thermal feedback of sorts.

The current-sense circuitry 212B provides feedback to the current controller 212C for use in controlling the current-control circuitry 212A to regulate the current in the LED string 208. The current-sense circuitry 212B may be implemented, for example, using an op-amp or using dual reference/comparator circuitry. In some implementations using an op-amp implementation of the current-sense circuitry 212B, it can be preferred to bias at a higher potential. In some implementations using a dual reference/comparator option for the current-sense circuitry 212B, it can be preferred to reverse the bias and bias at a lower potential. The current-sense circuitry 212B may be placed at any suitable location within the LED string 208 suitable for thermal considerations. In some implementations, it is desirable to keep the current-sense-circuitry, such as current-sense circuitry 201B, in a cool spot.

In this example, the current controller 212C is electrically connected to bias-voltage tap nodes 208N(1) and 208N(2) to provide a voltage bias to the current controller. As those skilled in the art will readily appreciate, the bias voltage that the current controller 212C needs to operate and the voltage drop across each LED package 208(1) to 208(N) can be used to determine the number of LED packages electrically located between the bias-voltage tap nodes 208N(1) and 208N(2). If a dual reference/comparator is use for the current-sense circuitry 212B, then the current controller 212C should be connected to nodes 208N(3) and 208N(4) on opposite electrical sides of the current-sense circuitry. The current controller 212C provides a bias for driving the current-control circuitry 212A via a node 212A(1). In some implementations, the current controller 212C may include a pair of op-amps (not shown), with one op-amp setting a reference and the other op-amp comparing the reference to an output of the current-sense circuitry 212B. The current-control circuitry 212A and the current-sense circuitry 212B may be electrically connected in series within the LED string 208.

In a specific example of the circuit 200 of FIG. 2, the current-control circuitry 212A includes a controlled element, such as a linear regulator, in electrical series with the LED string 208. This controlled element is provided to program and limit the current through the LED string 208 to a maximum value using comparators (not illustrated) of the current controller 212 that are biased by the controlled LED string 208. In some instantiations, a commercially available linear regulator controller integrated circuit may be implemented for controlling a commercially available linear regulator integrated circuit having thermal protection, and these may be implemented together to embody the current controller 212. The configuration of the circuit 200 allows the LED string 208 to operate below the current limit with minimal losses in the pass element. When the current limit is reached, the linear regulator limits the current into the LED string 208. The bias for the controlled element (an FET in one implementation) and the current-sense circuitry 212B (which may include a sense resistor (not shown) and two TLV431 series voltage references (available from Texas Instruments Inc., Dallas, Tex.), or similar comparators with references) is derived from the forward drop of the LED packages 208(1) to 208(N) in the controlled LED string 208. Such an arrangement allows for inexpensive and simple implementation of the bias supply while reducing losses and high voltage stress in a typical implementation, in which the bias is tapped off the input (full bus voltage) to the LED string 208 above the higher-voltage end 208A of the LED string.

When a TLV431 voltage regulator (available from Texas Instruments Inc., Dallas, Tex.), or similar, voltage regulator is used, the reference (common node) for the current-sense feedback from current-sense circuitry 212B may be generated to be below the cathode of the upper LED package at the bottom of the sense resistor. The bias from the LED package lower in the LED string 208 allows this to be accomplished with a second TLV431 voltage regulator without the need for two sensing points or more complicated common mode rejection of the signal. Low impedance may be used for current sense feedback. A fixed gain current sense op-amp may be used because of the lower component count and performance. Series limit and a parallel transient clamp may be used with the LED string 208 to prevent surge-event damage, for example, when the LED capacitance is charging or during field surge events. Connections may be made to the anode of an LED package further up the LED string 208 by one, two, or more LED packages and to the cathode of an adjacent LED package. These connection points may be used as references or biases for the current regulation control.

Figure 3A:
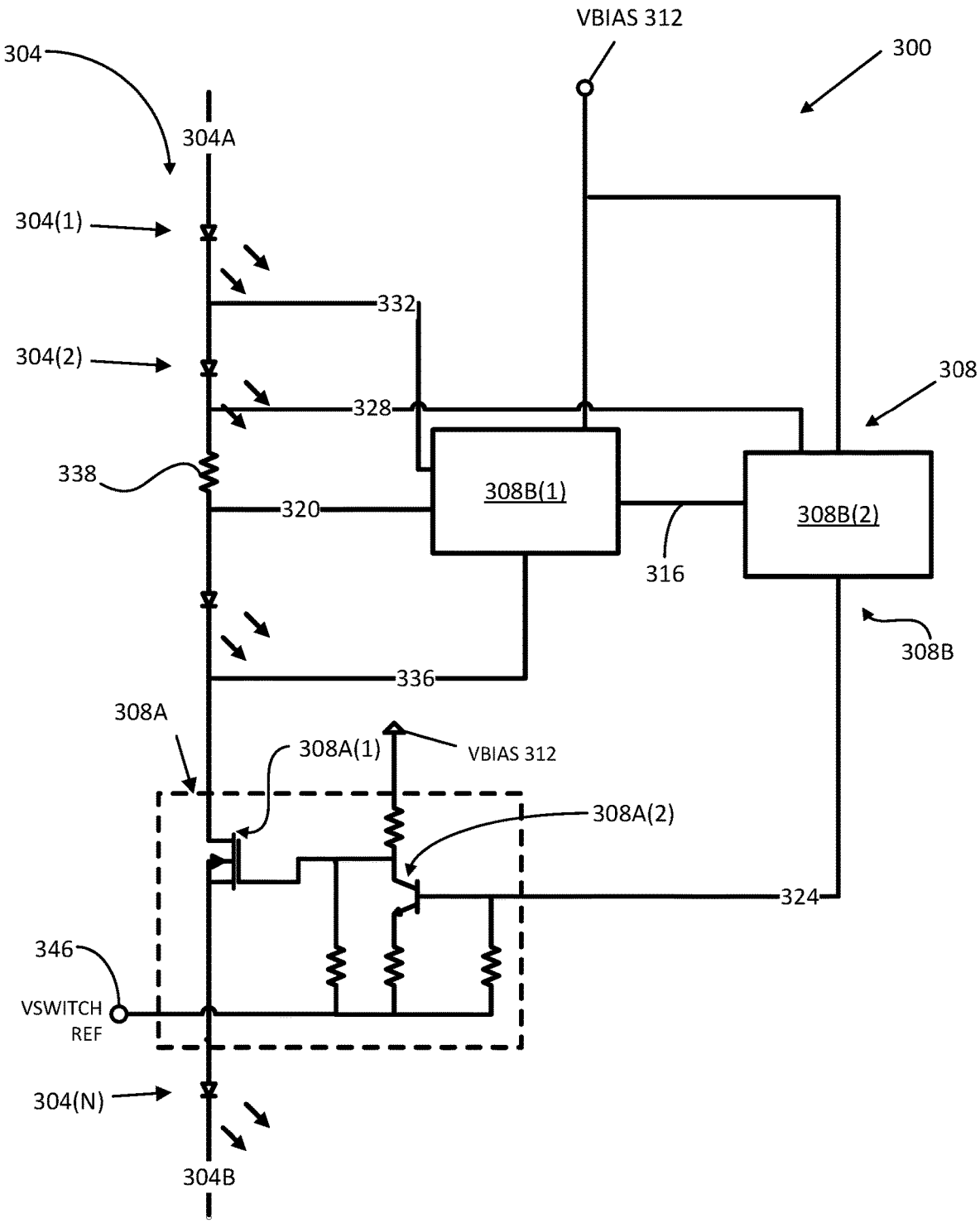
FIG. 3A is a circuit diagram illustrating an example electrical circuit that can be used in the apparatus of FIG. 1, in which electrical current in the LED string is controlled using a switching current controller in accordance with various implementations.

FIG. 3A illustrates circuitry 300 that can be implemented in any suitable apparatus, such as the apparatus 100 of FIG. 1 and/or in the circuit 200 of FIG. 2 as described below. Referring to FIG. 3A, the circuitry 300 includes an LED string 304 and a current-control system 308. A power supply is not illustrated for convenience. The current-control system 308 includes current-control circuitry 308A and a current controller 308B. In this example, the current-control circuitry 308A may be biased by a bias voltage, $V_{BIAs}$, which may be provided via a bias-voltage tap node 312.

In this example, the current controller 308B includes control blocks 308B(1) and 308B(2) that provide current sense and bias for current-control circuitry 308A. The control block 308B(1) regulates the voltage of node 316 to a constant value below node 320. The control block 308B(2) regulates the current into node 324 based on the voltage of node 328 relative to the node 316. The series order of the current controller 308B and the current-control circuitry 308A may be changed, for example, based on layout of a printed circuit board on which the circuit is implemented. It is noted that the node 332 may be electrically connected to node 312 or the node 312 may be electrically connected further up the LED string 304 toward the higher-voltage end 304A of the LED string. The number of LED packages 304(1) to 304(N) between nodes 332 and 336 are determined by the forward voltage drop.

As mentioned above, the circuitry 300 of FIG. 3A can be implemented in the circuit 200 of FIG. 2. This can be accomplished, for example, by electrically connecting higher and lower voltage ends 304A and 304B of the LED string 304 across the power supply 204 in FIG. 2, thereby replacing LED string 208 and current-control system 212 with the LED string 304 and current-control system 308 of FIG. 3A.

In this example, current-control circuitry 308A is shown as including an N-channel MOSFET 308A(1), which could be a depletion mode or enhancement mode MOSFET. In one instantiation, the N-channel MOSFET 308A(1) may be an enhancement mode Power FET. To turn on the N-channel MOSFET 308A(1), current is drawn from the voltage-bias tap node 312. To turn it off or increase its resistance (to decrease current in the LED string 304) current from node 324 goes into the base of an NPN bipolar junction transistor (BJT) 308A(2).

Figure 3B:
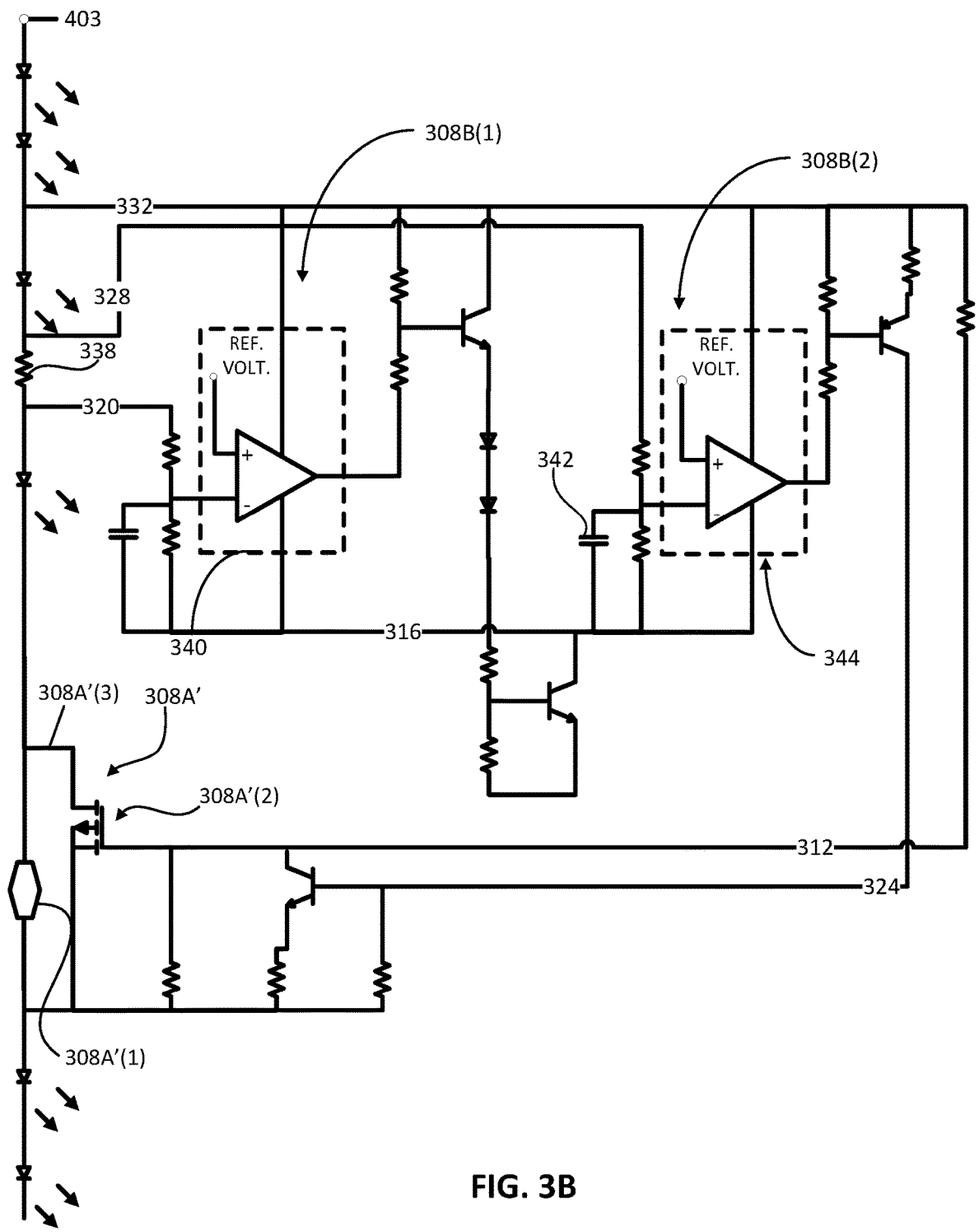
FIG. 3B is a circuit diagram illustrating example electrical circuitry for the control blocks of the circuit illustrated in FIG. 3A in accordance with various implementations.

Control block 308B(1) creates a reference for control block 308B(2) so that a sufficient increase of voltage from node 328 to node 320 across a current-sense resistor 338 results in current into node 324. The current into node 324 biases the NPN BJT 308A(2), pulling current away from the gate of the N-channel MOSFET 308A(1). The current may be regulated through this loop. In some implementations and as seen in FIG. 3B, a capacitor 342, or more complicated compensation block, can be placed between the output and input of the op-amp/reference combination 344 of control block 308B(2). This is where any desired compensation can be easily included. It is noted that similar circuitry could be made with P channel devices or devices of other materials, but currently N-channel devices are less expensive.

In the implementation shown in FIG. 3A, a $V_{switch}$ REF node 346 and node 324 are shown as being separate to indicate that in other implementations they all could be positioned further down the LED string 308 (for N-channel implementations or up the LED string for P-channel implementations). This flexibility can be helpful, for example for "hiding" the current-control circuitry 308A in places that are not needed for getting light out and/or lessening the heat that the switch (e.g., N-channel MOSFET 308A(1)) is exposed to more effectively by moving it to an edge of a corresponding circuit board (not shown) away from the other heat sources.

It is noted that the design of the example circuitry of FIG. 3A was motivated by wanting to use specific relatively inexpensive comparator/reference combination devices, which utilize 0.4 V-1.4 V references. In an implementation, that much voltage could not be dropped on the sense resistor 338 because of the power loss. However, dropping the reference voltage into the comparator/reference below the sense resistor 338 allows use of a lower power sense resistor and an inexpensive comparator/reference. Current sense op-amps with good common mode rejection make it more elegant with fewer components and may be used in products where total assembled cost is lower.

As noted above, the current-sense resistor 338 is provided in the implementation to generate a voltage drop after the current sense resistor that is in a good range for the comparator. Prior art circuitry did not have the control block 308B(1). Rather, the control block 308B(2) was connected to node 336 and regulated current on the combined voltage of the sense resistor 338 and a diode (not shown) was connected to node 336. The forward drop of an LED changes with current and voltage. Control block 308B(1) removes that variation by providing a stiffer lower reference to control block 308B(2).

FIG. 3B illustrates an op-amp/reference based implementation of blocks 308B(1) and 308B(2) of FIG. 3A, with node 332 electrically connected to node 312. As seen in FIG. 3B, in this implementation, control block 308B(1) includes an op-amp/reference combination 340, and control block 308B(2) includes an op-amp-reference combination 344. In a specific implementation, each of the op-amp/reference combinations 340 and 344 of blocks 308B(1) and 308B(2) may be a micropower, low-voltage reference, such as an LT6650 low-voltage reference available from Linear Technology Corporation, Milpitas, Calif., that includes a 400 mV reference and a rail-to-rail op-amp. In other implementations, each of the op-amp/reference combinations 340 and 344 may be implemented in another suitable manner.

The current-sense resistor 338 is measured at nodes 328 and 320. The op-amp/reference combination 344 has a built-in reference voltage larger than intended operation of the current sense resistor. A lower power current sense resistor network may be used if the built-in reference is compared to a generated reference. The op-amp/reference combination 344 may be referenced to node 308A'(3), but the voltage variations of the LED packages 304(1) to 304(N) electrically downstream of the current-sense resistor between nodes 320 and 308A'(3) are included in the feedback, which can lead to higher currents at higher temperatures because of the change of the LEDs' impedance. The op-amp/reference combination 340 provides a reference to the comparator of the op-amp/reference combination 344 at a regulated value below node 320. The op-amp/reference combination 340 offers another compensation filter and external control input option. Voltage at node 328 higher than the reference of the op-amp/reference combination 344 will pass current into node 324. Current into node 324 biases the NPN BJT 308B(2) taking current from the gate node of the N-channel MOSFET 308A(1). This will raise the resistance of the N-channel MOSFET 308A(1), limiting the current in LED string 304. Current into node 312 from node 332 may decrease the resistance of the N-channel MOSFET 308A(1) provided the gate is not pulled down by the NPN BJT 308A(2). The op-amp/reference combination 344 passes enough current to limit the voltage across the sense resistor 338. Currents below the limit are allowed.

The current-control circuitry 308A' of FIG. 3B is a slightly modified version of the current-control circuitry 308A of FIG. 3A. The current-control circuitry 308A' of FIG. B includes a protection block 308A'(1) that may include, for example, a small-value capacitor (not shown) and a transient protector (not shown), such as a transorb or transient voltage suppressor. The protection block 308A'(1) may be provided when the switcher (e.g., MOSFET 308A'(1)) does not include its own protection circuitry.

Figure 4:
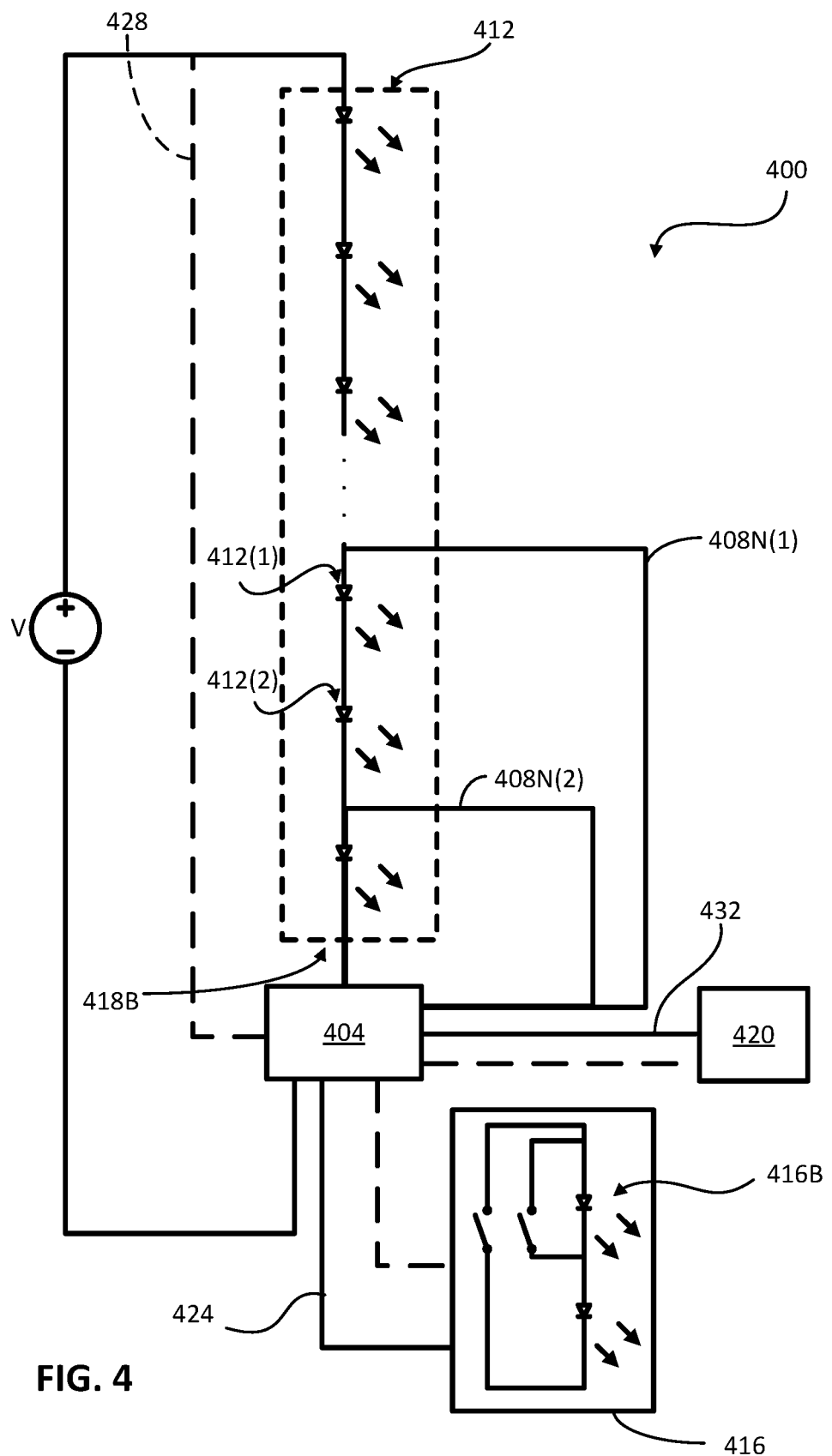
FIG. 4 is a circuit diagram illustrating an example electrical circuit that can be used in the apparatus of FIG. 1, in which the circuit includes a first LED string, a second LED string powered by the first LED string, and a current-control system configured to control electrical current through the main LED string in accordance with various implementations.

FIG. 4 illustrates a circuit 400 having a current-control system 404 that includes current-control circuitry (not illustrated, but located within the current-control system 404) and a current controller (not illustrated, but also located within the current-control system 404). The current control system 404 is biased via bias-voltage tap nodes 408N(1) and 408N(2) within an LED string 412. In this example, the bias voltage between the bias-voltage tap nodes 408N(1) and 408N(2) is equal to the voltage drop within the LED string 412 between two of the LED packages, namely LED packages 412(1) and 412(2). The rest of the LED packages within the LED string 412 are not labeled for convenience. As discussed above in connection with other implementations, the locations of the bias-voltage tap nodes 408N(1) and 408N(2) in the LED string 412 and the number of LED packages located between the bias-voltage tap nodes can vary depending on the relevant parameters of the circuitry implemented. Likewise, while the location of the current-control circuitry (here, located within the current-control system 404) is shown as being located at the low-voltage end 412B of the LED string 412, in other designs it can be placed elsewhere, such as between LED packages within the LED string.

In this example, circuit 400 includes, as options, a first auxiliary load 416 and a second auxiliary load 420, each powered by the current-control system 404. In the implementation shown, the first auxiliary load 416 includes a second LED string 416B, which may have light-output characteristics (e.g., spectral content) the same as or different from the light-output characteristics (e.g., spectral content) of LED string 412. The second auxiliary load 420, if provided, may include any one or more of a variety of loads, such as an LED string, a standard dimming interface, onboard communications (e.g., radio), or control circuitry (e.g., for power conversion, housekeeping, lighting controls, or any other application), among others.

In some implementations and as described below, the second LED string 416B can work in conjunction with current-control system 404 via a connection 424 to change the ratios between the current in the LED string 412 via an optional connection 428 and the current into the second LED string 416B. Optional connection 428 is largely like node 640 for the catch winding 628 in FIG. 6. It may be used if a large range of control is desired among the differing LED strings. In some implementations, the first auxiliary load 416 may include a switch (not shown) to modify the reflected impedance. Harmonization between the current-control system 404 and the second auxiliary block 420, if present, may be simplified with a connection 432. In some implementations, the current-control system 404 may include a switch (not shown) to short across the input to the current-control circuitry within the current control systems. Such an implementation may be implemented with an inexpensive switching element and avoid winding losses at low currents.

In some implementations, the second LED string 416B may be powered using current tapped from the first LED string 412. In some implementations in which the optional connection 428 is provided, the second LED string 416 may be powered from that connection. In some examples implementing the optional connection 428, control of the second LED string 416B may be accomplished via an external control (not shown, but using a conventional control scheme) or parameters of a fixture of which circuit 400 is a part. In an artificial growing light context, parameters of such a fixture may include feedback from crop canopy height measurements, spectral reflectance measurements, thermal measurements, or other measurements, among others. When the second auxiliary load 420 includes control circuitry (not shown), such control circuitry may be used for controlling the first and second LED strings 412 and 416B.

The circuit 400 of FIG. 4 may be used in the apparatus 100 of FIG. 1, and/or any one or more of various components and features of the circuit 400, such as the first and second auxiliary loads 416 and 420, may be implemented in another circuit of the present disclosure, such as circuit 200 of FIG. 2. It is also noted that circuitry of other disclosed implementations, such as circuitry of circuitry of current-control circuitry 308A, 308A' and blocks 308B(1) and 308B(2) of FIGS. 3A and 3B may be implemented in the circuit 400 of FIG. 4. Those skilled in the art will readily understand how to mix and match circuitry components and blocks to make circuits that operate using the broad principles of this disclosure.

Figure 5:
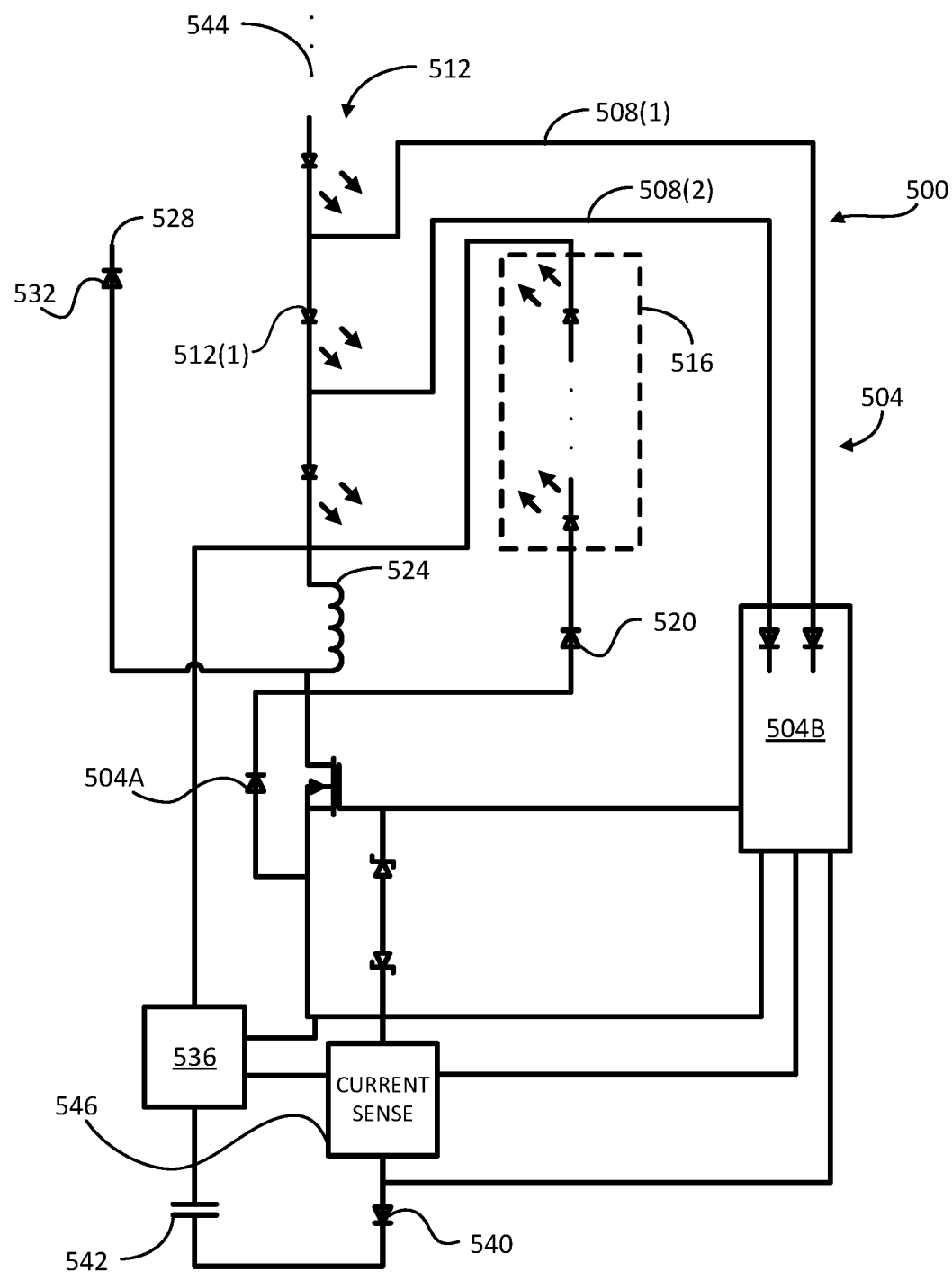
FIG. 5 is a circuit diagram illustrating example electrical circuitry that can be used in the apparatus of FIG. 1, in which the circuitry includes a main LED string and an auxiliary LED string powered via a bias-voltage across an inductor electrically in series within the main LED string in accordance with various implementations.

FIG. 5 illustrates circuitry 500 that can be used, for example, in apparatus 100 of FIG. 1 and/or be substituted for related circuitry in circuits disclosed herein, such as circuit 200 of FIG. 2 and circuit 400 of FIG. 4, for example. Referring to FIG. 5, circuitry 500 includes a current-control system 504 having current-control circuitry 504A and a current controller 504B biased via two bias-voltage tap nodes 508(1) and 508(2) within an LED string 512. It is noted that while this example shows the bias-voltage tap nodes 508(1) and 508(2) with only a single LED package 512(1) between them such that the bias voltage for the current-control system 404 is equal to only the voltage drop within the LED string 512 across that LED package 512(1), in other implementations the bias-voltage tap nodes may be located across more than a single LED package and/or may be located elsewhere in the LED string as discussed elsewhere herein.

The circuitry 500 of FIG. 5 further includes a second LED string 516 electrically connected through a rectifier diode 520 to the LED string 512 across an inductor 524. An optional connection 528 and rectifying diode 532 may be provided, for example, as an energy-recovery node. In some implementations, the second LED string 516 may be inhibited or omitted to make connection 528 the main rectifying node for an buck-boost inverted output converter with the LED string 512. When included, block 536 may provide low impedance across the input of the current-control circuitry 504A at very low currents and/or low supply input, effectively providing an electrical short around the current-control circuitry. Those skilled in the art will understand that a rectifier 540 may be used with some choices of the current-control circuitry 504A. In this example, a capacitor 542 is provided to connect the negative side of the power supply (not shown) electrically downstream of the LED string 512. This capacitor 542 is provided to dominate the capacitance divider at startup. The LED string 512 has low capacitance relative to the other blocks in series. The startup inrush power may be consumed in transient protection. With the capacitor 542, inrush currents and transients will not be dominated by parasitic impedances in the circuit.

The circuitry 500 of FIG. 5 also includes a current-sense block 546. In the example shown, the current-sense block 546 is located electrically downstream of the current-control circuitry 504A. In other implementations and as mentioned elsewhere herein relative to another implementation, the current-sense block 546 may be located electrically upstream of the current-control circuitry 504A depending on design parameters.

The circuitry 500 of FIG. 5 may be used in the apparatus 100 of FIG. 1, and/or any one or more of various components and features of the circuitry 500, such as the second LED string 516 and its connectivity, may be implemented in another circuit of the present disclosure, such as circuit 200 of FIG. 2 and/or circuit 400 of FIG. 4. It is also noted that circuitry of other disclosed implementations, such as circuitry of circuitry of current-control circuitry 308A, 308A' and blocks 308B(1) and 308B(2) of FIGS. 3A and 3B may be implemented in the current-control system 504 of FIG. 5. Those skilled in the art will readily understand how to mix and match circuitry components and blocks to make circuits that operate using the broad principles of this disclosure. It is additionally noted that if the second LED string 516 is omitted, as those skilled in the art will appreciate, remaining portions of the circuitry 500 can function in a buck/boost mode with the inductor 524 returning current through rectifier 532 to node 528. Filtering and connecting node 528 to the input of the main string can be advantageous, for example, when the first LED string 512 is a 200V-400V LED string.

Figure 6:
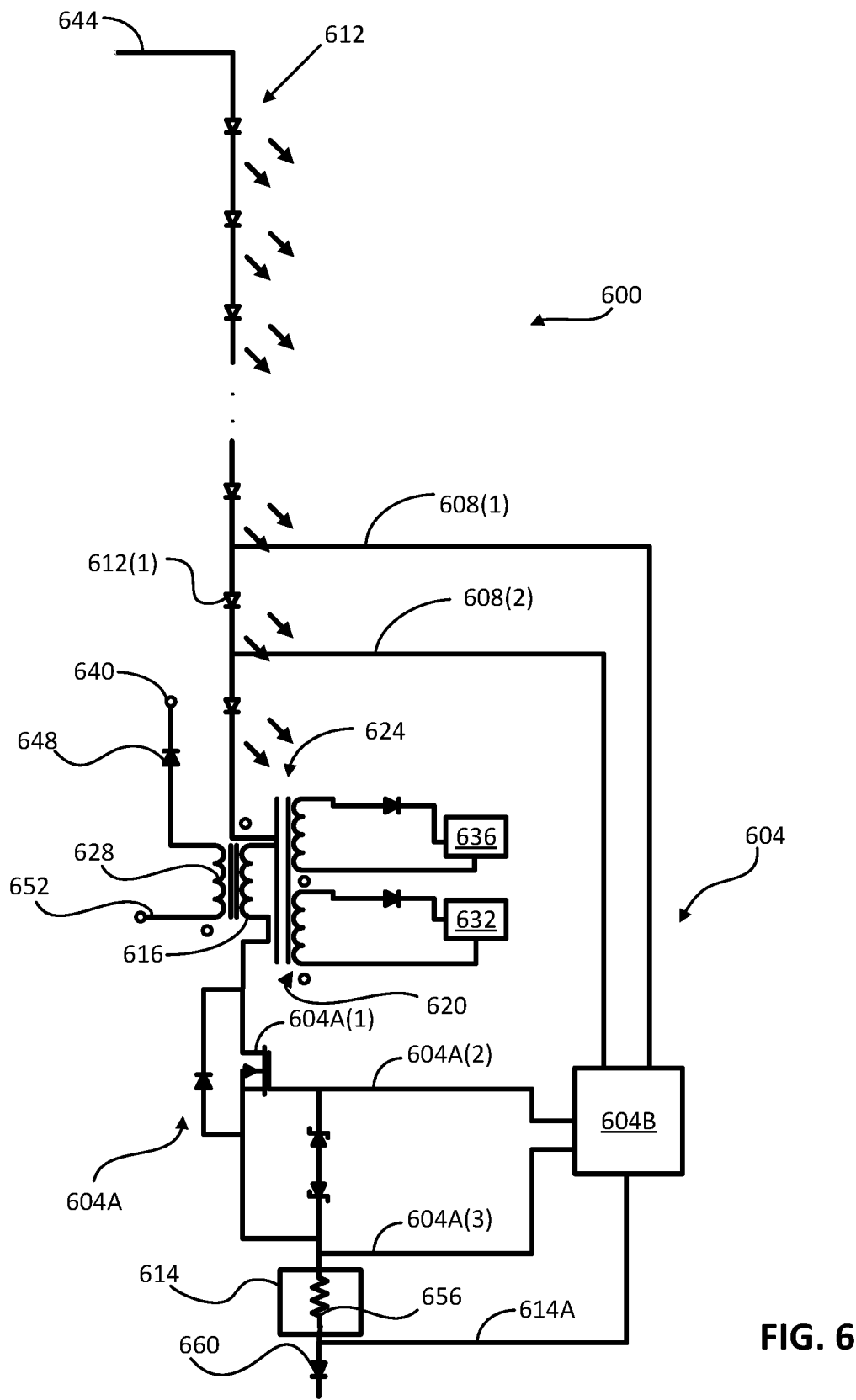
FIG. 6 is a circuit diagram illustrating example electrical circuitry that can be used in the apparatus of FIG. 1, in which the circuitry includes a first LED string and one or more electrical loads powered by inductive coupling with a inductive winding electrically in series with the first LED string in accordance with various implementations.

FIG. 6 illustrates circuitry 600 that can be used, for example, in apparatus 100 of FIG. 1 and/or substituted for related circuitry in circuits disclosed herein, such as circuit 200 of FIG. 2 and circuit 400 of FIG. 4, for example. Referring to FIG. 6, the circuitry 600 includes a current-control system 604 having current-control circuitry 604A and a current controller 604B biased via two bias-voltage tap nodes 608(1) and 608(2) within a main LED string 612. It is noted that while this example shows the bias-voltage tap nodes 608(1) and 608(2) with only a single LED package 612(1) between them such that the bias voltage for the current-control system 404 is equal to only the voltage drop within the main LED string 612 across that LED package 612(1), in other implementations the bias-voltage tap nodes may be located across more than a single LED package and/or may be located elsewhere in the LED string as discussed elsewhere herein. In this example, the circuitry 600 includes a current-sense block 614 connected to the current controller 604B via a node 614(A). In the example shown, current-control circuitry 604A includes an N-channel MOSFET 604A(1) and the gate of the MOSFET is connected to a gate-drive node 604A(2). A source pin of the N-channel MOSFET 604A(1) is connected to the current controller 604B by a connection 604A(3).

The circuitry 600 of FIG. 6 further includes a primary winding 616 in electrical series with the main LED string 612. In this example, each of a first secondary winding 620, a second secondary winding 624, and a catch winding 628 are coupled to the primary winding 616. In the implementation shown, the first secondary winding 620 provides power to a first auxiliary load 632, and the second secondary winding 624 provides power to a second auxiliary load 636. Each of the first and second auxiliary loads 632 and 636 may be any suitable electrical load, such as one or more LED strings, a standard dimming interface, onboard communications (e.g., radio), or control circuitry (e.g., for power conversion, housekeeping, lighting controls, or any other application), among others. Fundamentally, there is no limitation on the type of electrical load for each of the first and secondary auxiliary loads 632 and 636 other than they have power requirements suitable for the circuitry 600 and that they provide the requisite functionality for the apparatus implementing the circuitry. In some implementations, the catch winding 628 may be in electrical communication with, for example, a storage element (not shown).

Power may be transferred through the first and second secondary windings 620 and 624 and the catch winding 628 by impedance reflected from the first auxiliary load 632 (e.g., LED string(s)) in conjunction with the operation of the current control system 604. As the impedance of the first auxiliary load 632 increases, more of the energy stored in the primary winding 616 is transferred through the catch-winding 628. In some implementations, the node 640 may be electrically connected to node 644 or to a node (not shown) within the main LED string 612 using a capacitance (not shown). The capacitance may be selected to minimize ringing at the attachment point of diode 648. In some implementations, node 652 may be electrically connected to node 656. If a small contribution from the catch winding 628 is expected, it may be desirable to dump the energy more locally. If there is enough energy in a particular application, it can be desirable to return it to the input.

The catch-winding 628 may be placed where energy recovery storage is most convenient. The efficiency of this is typically dominated by the leakage between the catch-winding 628 and the primary winding 616, the rectifier selection, and the ratio of winding capacitance to input node impedance. If a rectifier (not shown) is added from the connection of the primary winding 616 connection to the current-control circuitry 604A to a point further up the main LED string 612 connected to the primary winding in a typical inverted buck converter fashion, then energy may still be recovered if the leakage between the primary winding 616 and the catch winding 628 is low enough. This configuration would expose the current-control circuitry 604A to much higher voltage stresses but may allow for a larger range of currents in the different controlled strings. Diode 648 needs to have quick reverse recovery, and the energy has to be snubbed or dampened in this case in parallel with the capacitance of the diode 648. The lower the leakage between the primary winding 616 and the catch winding 628, the more the energy that may be recovered. Lowering the leakage usually increases the interwinding capacitance, and there is a tradeoff if this higher capacitance causes electromagnetic interference issues that should be dampened, resulting in some power loss. Those skilled in the art will understand that a rectifier 660 may be used with some choices of the current-control circuitry 604A.

In an example alternative implementation, the node 652 may be electrically connected to the drain of current-control circuitry 604A (i.e., between the primary winding 616 and the current-control circuitry 604A in FIG. 6), and the node 640 may be tied, for example, to one of the bias-voltage tap nodes 608(1) and 608(2) or further up the LED string 612, for example, all the way to node 644. This allows the energy stored in the primary and catch windings 616 and 628 to dissipate in current through the diode 648. This can be used in the full system to divert most of the power in the system to the LED string 612. In some applications, the LED string 612 will be the only light source load, and the first and second windings 620 and 624 will only be used, for example, for auxiliary loads and sensing. The first and second windings 620 and 624 may be eliminated if resonant switching is not present.

The addition of a second current-sense block (not shown) in series with the diode 648 can provide improved regulation at low-power operating modes with this configuration. If regulation at lower power levels is not critical, the additional current-sense block is not needed. Because of the high rate of voltage change on these nodes, current sense transformers or optocouplers may be used to simplify the layout and complexity.

The circuitry 600 of FIG. 6 may be used in the apparatus 100 of FIG. 1, and/or any one or more of various components and features of the circuitry 600, such as the first and/or second auxiliary loads 632 and 636 and the catch-winding 628 and their respective connectivity to the primary winding 616, may be implemented in another circuit of the present disclosure, such as circuit 200 of FIG. 2 and/or circuit 400 of FIG. 4. It is also noted that circuitry of other disclosed implementations, such as circuitry of circuitry of current-control circuitry 308A, 308A' and blocks 308B(1) and 308B(2) of FIGS. 3A and 3B may be implemented in the current-control system 604 of FIG. 6. Those skilled in the art will readily understand how to mix and match circuitry components and blocks to make circuits that operate using the broad principles of this disclosure.

Example Implementations

Figure 7A:
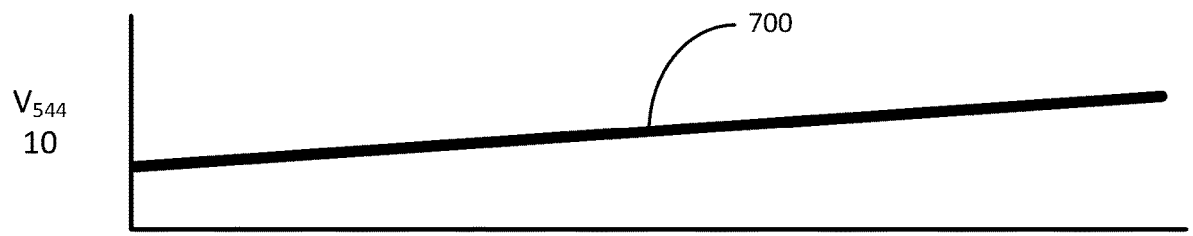
FIG. 7A to 7E are waveforms of current or voltage at several locations within the circuitry of FIG. 5 as the system input voltage is rising in accordance with various implementations.
Figure 7B:
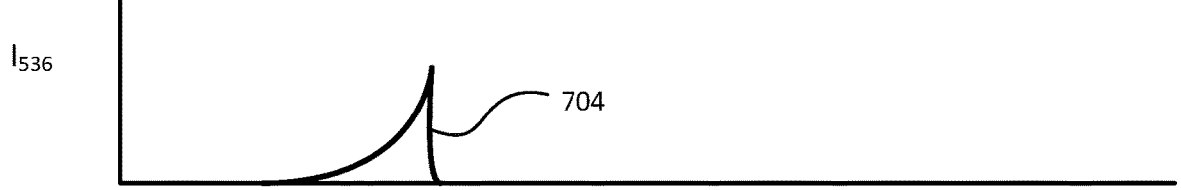
Figure 7C:
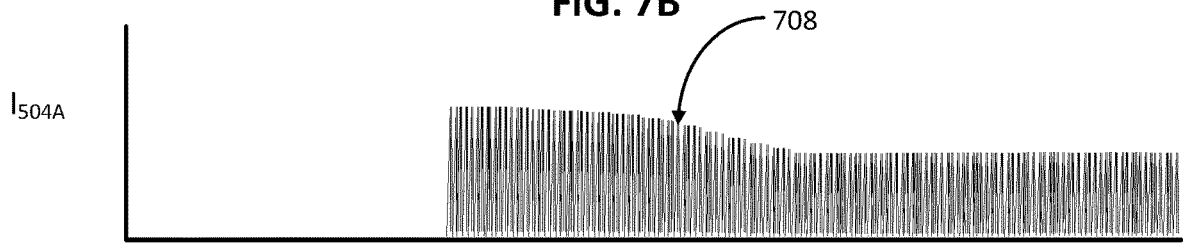
Figure 7D:
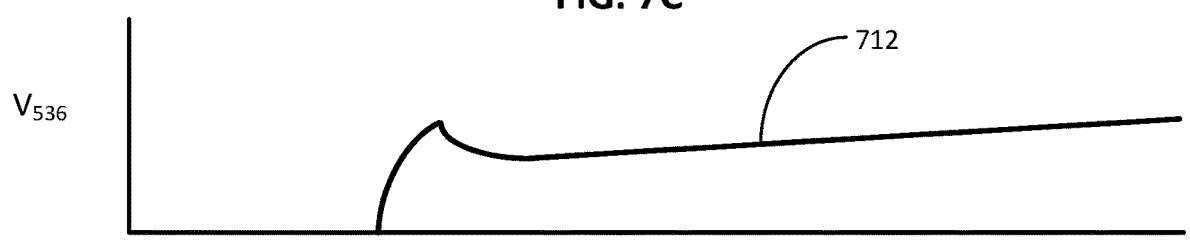
Figure 7E:
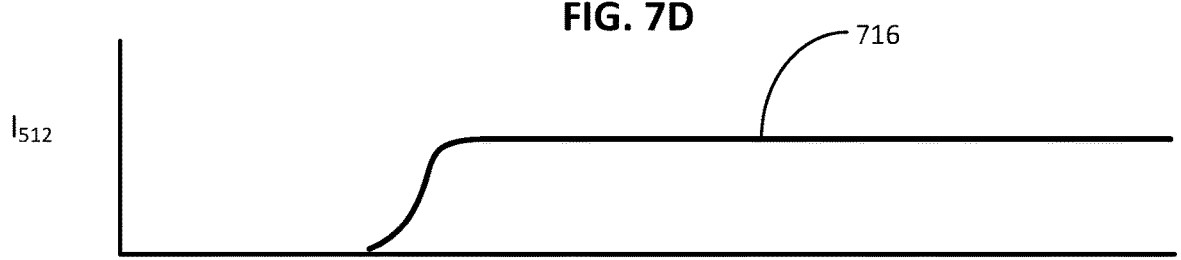

One example implementation uses a peak current mode switcher as the current-control circuitry in series with a main LED string. This peak current mode switcher, or simply "switcher," was initially implemented with the output of the switcher as a buck boost into three red LED packages. This was intended primarily as a regulated maximum current limit for the main LED string, with the red LED packages only acting as inexpensive indicators of current in the main LED string. Other modes of signaling system operation are also possible and may only be used during commissioning or indicating fault conditions of the system Another example implementation utilized the circuitry 500 of FIG. 5. Referring now to FIGS. 7A to 7E and also to FIG. 5, FIGS. 7A to 7E show, respectively, example waveforms for rising system input voltage at node 544 (FIG. 5), as illustrated by voltage waveform 700 of FIG. 7A. It is noted that the plots of FIGS. 7A to 7E share a common timescale. With the rising voltage at node 544 (FIG. 5) of the voltage waveform 700 of FIG. A, FIG. 7B shows the corresponding current waveform 704 at the block 536 (FIG. 5), FIG. 7C shows the corresponding current waveform 708 of the current at the current-control circuitry (FIG. 5), FIG. 7D shows the corresponding voltage waveform 712 of the voltage at the block 536 (FIG. 5), and FIG. 7E shows the corresponding current waveform 716 of the current through the LED string 512.

The switchover point and set point can be modified to different values. The value of capacitance at the $V_{in}$ node (in this example, a node between the input end of the inductor 524 and the output of the current-sense block 546) dominates the delay of the startup of the current-control system 504 with rising system input voltage. The value of the capacitance at the $V_{in}$ node dominates the delay before the current-control system 504 can limit the current in the main LED string 512 in the case of rapidly rising system input voltage at node 544. In the example implementation, the current-control system 504 was set to limit closer to 150 mA. $V_{in}$ grows with the system voltage. If there is too little hysteresis between the shunt cutoff and the control of the current-control system 504, then it will induce a flash in any LED in series with the LED string 512 and/or possibly coupled winding loads, as well. In the example implementation, this flash was avoided. However, in some applications the flash may be a useful visual signal to someone tuning the system to make sure that the LED strings, here the LED strings 512 and 516, have gone into a different mode of operation. If the current limit mode of the current-control system 504 provided a different spectrum because of the auxiliary LED string, here LED string 516, this would be assurance when installing a system that the controls were set correctly. The output may also be fully or partially shunted with a block similar to auxiliary load 416, but the switcher is allowed to run.

In an example, if a conventionally controlled power supply is connected to multiple parallel LED strings, there will be differences between the currents in the parallel LED strings. If more power is diverted to the main LED string controlled by a peak current mode switcher (i.e., current-control circuitry), then the main LED string can serve as a primary light source for the application and allow spectral modification with control systems currently employed. Such a power supply is typically externally controlled to reduce the power to the load to reduce light output. This can be used in conjunction with the peak current mode switcher of this implementation. If spectra different from the main LED string are used in one or more additional parallel strings, this configuration allows for spectral shift with controlled output power from the power supply. As the output of the power supply increases, there will be more light content from the main LED string controlled by the peak current mode switcher. This allows for a load that has a different ratio of near red (about 600 nm to about 700 nm wavelength) to far red (about 700 nm to about 800 nm wavelength) at lower power levels than at high power levels. The ratio changes with the power in the load and the standard control of the power supply.

In another example implementation using a main LED string and a second, or auxiliary, LED string embodied in a light bar, the main LED string may contain all of the desired spectral content and far-red content but a reduced near-red content and the auxiliary LED string contains near-red content missing from the main LED string. This implementation may be suitable for artificial-sunlight sources for growing certain types of plants. As is known, certain plants respond in known ways to changing light conditions, including changing ratios of near-red to far-red content throughout daylight hours as the position of the sun changes position in the sky or when shaded. In this implementation, the auxiliary LED string may be controlled to introduce more near-red content, changing the ratio of near-red to far-red based on controlling the main and auxiliary LED strings. The control of this ratio may be change based on system input parameters and/or through external and/or internal signals. In an example, the circuitry 600 of FIG. 6 is used, with the main LED string 604 having the reduced near-red content and the first auxiliary load 632 being the auxiliary LED string containing near-red content missing from the main LED string.

In this implementation, the current in the main LED string may be dimmable but regulated at a maximum, and the auxiliary LED string may add light at the ends of the light bar. This allows for operation of the light bar at no or low current in the end auxiliary LED string when only growing equipment, such as water pumps, is located at those ends and also for content-changing operation when plants are located at those ends. This added flexibility in the system operation allows for changes in crop or rack spacing, reducing the need for light-bar reconfiguration and multiple SKU units.

As the light-bar dims to lower values, the spectral ratios remain relatively close other than variation-caused thermal effects. At a selected point on the dimming curve, one or many of the areas of the spectrum may be reduced with further dimming. At the end of the dim curve, the fixture may turn off. One possible implementation would be to lower the near-red content below the selected point. This could have a desirable effect with some cultivars by mimicking the spectral change at sunrise/sunset. This still allows the change of aspiration at the end of the light cycle to prevent too much humidity present when the lights are turned off.

In some implementations, because the bias supply for the current controller is supplied from bias-voltage tap nodes within an LED string, the input voltage, yin, to the current-control circuitry is permitted to fall below the supply requirements for the current controller.

The relative load currents can be controlled. This may be set as a function of input voltage levels or externally controlled. If the system is operated on a simple supply, the input voltage may be the only available input channel. Proper dead bands may be incorporated to minimize effects of line losses. If the system is externally controlled, a primary or secondary shunt and alternate load currents may be set through communication over the input DC or other means powered by the alternate load energy or the main LED string.

In a particular instantiation, the intended operation of an apparatus of the present disclosure, such as apparatus 100 of FIG. 1 (e.g., implementing the circuitry 600 of FIG. 6), is to offer everything normally present in a grow spectrum except all the near-red content at a lower system input voltage. At higher system input voltages, near-red content is added. In this manner the system would offer dimming and red-content ratio change. As example additions to this operation, external controls may be summed into the control points for the main and auxiliary LED strings. As discuss above, supply for external loads is another option that may be exploited for communication and sensing modules.

Figure 8A:
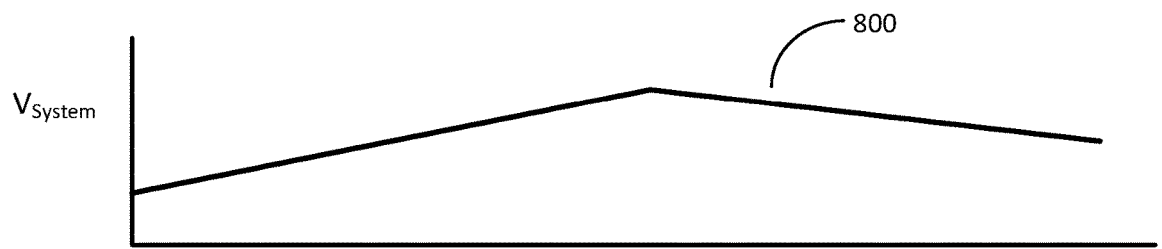
FIG. 8A to 8D are waveforms of current or voltage at several locations within the circuitry of FIG. 6 as the system input voltage is changed to change the ratio of near-red and far-red light output by the combination of the main and auxiliary LED strings in accordance with various implementations.
Figure 8B:
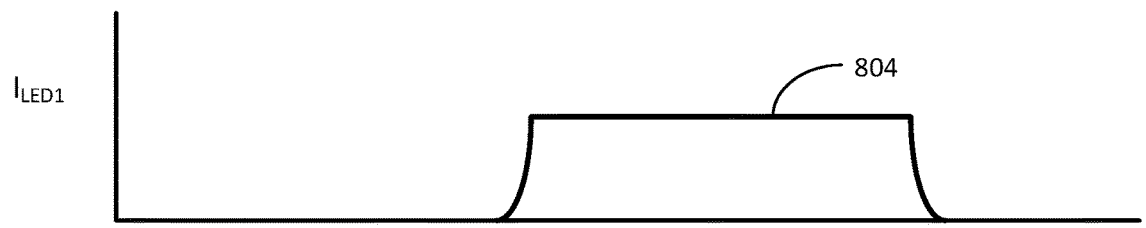
Figure 8C:
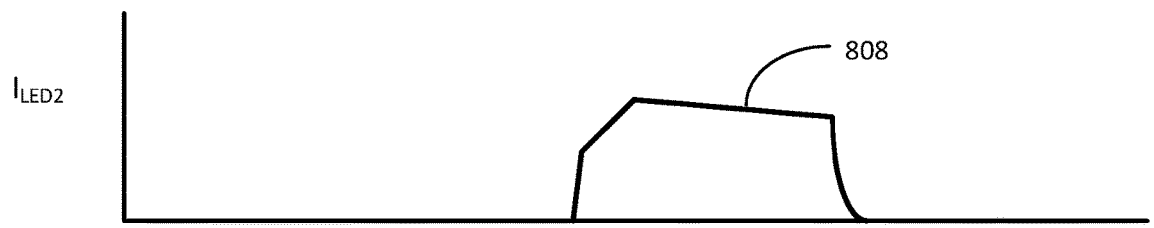
Figure 8D:
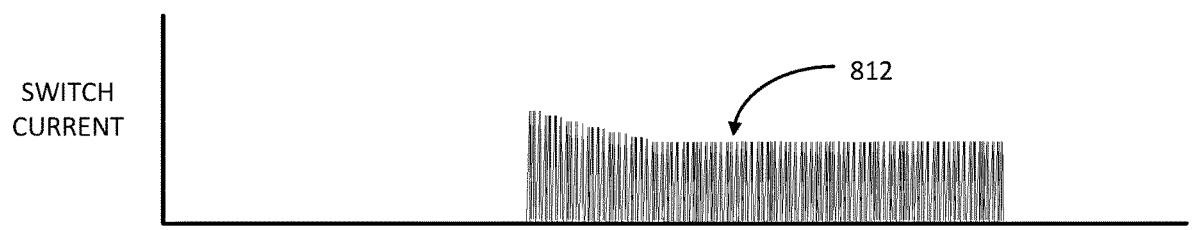

As an example and referring to FIGS. 8A to 8D and also to FIG. 6, FIG. 8A illustrates an example voltage waveform 800 of the system input voltage at node 644, and FIGS. 8B to 8D show, respectively, current waveforms 804, 808, and 812 for the corresponding currents in the main LED string 612 (FIG. 6), an auxiliary LED string in the first auxiliary load 632, and the current-control circuitry 604A, which are labeled $I_{LED1}$, $I_{LED2}$, and SWITCH CURRENT respectively in FIGS. 8B to 8D. It is noted that the plots of FIGS. 8A to 8D share a common timescale. As the system input voltage (waveform 800 of FIG. 8A) passes the forward voltage of the main LED string 612 (FIG. 6), the current-control system 604 limits the current $I_{LED1}$ in the main LED string, as indicated by current waveform 804 of FIG. 8B. The input voltage to the current-control system 604 rises with the rising system input voltage. When it reaches a predetermined point, (e.g., less than 10 volts shown here) the auxiliary LED string of the first auxiliary load 632 is allowed to pass current $I_{LED2}$, as indicated at waveform 808 of FIG. 8C. As the system input voltage continues to rise, the auxiliary LED string is regulated as well. Some of this results in energy loss in the control of the auxiliary LED string, and some is forced back through the catch diode to node 644 capacitance of the main LED string 612. SWITCH CURRENT in FIG. 8D is the voltage of the sense resistor for the switching converter and represents the current in the switch in the current-control circuitry 604A. Different ratios of spectrum may be achieved at different points in the system input voltage.

Current sense of the main LED string 612 in this example used the current sense op-amp option. This provided feedback for the current-control system 604 and short/shunt operation. There are switcher controllers with integrated FETs currently available at low cost with very good automotive reliability testing results. They do not offer a simple shutdown function. In order to work with these parts, a FET was added in parallel with the converter to short around it at low/dimmed currents in the main LED string 612. This also resulted in higher efficiency at the low/dimmed main string currents than if the converter were operating. The current through catch diode 648 into node 640 drops when the auxiliary LED string of the first auxiliary load 632 is activated.

The foregoing has been a detailed description of illustrative implementations of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various implementations described above may be combined with features of other described implementations as appropriate in order to provide a multiplicity of feature combinations in associated new implementations. Furthermore, while the foregoing describes a number of separate implementations, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary implementations have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. An apparatus, comprising:
   a first light-emitting diode (LED) string that includes a first plurality of LED packages connected in electrical series with one another;
   a second LED string powered by the first LED string, the second LED string being electrically connected to baising nodes within the first LED string;
   current-control circuitry operatively connected to the first LED string configured to control an electrical current in the first LED string; and
   a current controller operatively connected to the current-control circuitry and using a bias voltage for operation;
   wherein the current controller is operatively configured to cause the current-control circuitry to control the electrical current, the current controller is electrically connected to bias-voltage tap nodes in the first LED string so as to provide the bias voltage, the bias-voltage tap nodes having one or more of the first plurality of LED packages located therebetween so that the bias voltage is provided by a voltage drop across the one or more of the LEDs located between the bias-voltage tap nodes, and
   wherein during operation, the LED string has a higher-voltage end and a lower-voltage end, the first plurality of LED packages includes at least a first LED package located at the higher- voltage end and at least one second LED package electrically located downstream of the first LED package, the bias-voltage tap nodes tap into the LED string are located on opposite side of the second LED package, and the current-control circuitry controls the electrical current in the LED string at a location in the LED string closer to the lower-voltage end than the bias- voltage tap nodes.

2. The apparatus of claim 1, wherein the current-control circuitry comprises a linear current controller that controls the electrical current in the first LED string.

3. The apparatus of claim 1, wherein the current-control circuitry includes a switching current controller that controls the electrical current in the first LED string.

4. The apparatus of claim 1, wherein the current controller includes a current sensor that senses the electrical current in the first LED string.

5. The apparatus of claim 4, wherein the current controller includes a current-sense op-amp.

6. The apparatus of claim 1, further comprising a housing that contains first LED string, the current-control circuitry, and the current controller.

7. The apparatus of claim 6, further comprising a power supply electrically coupled to the first LED string for powering the first LED string and integrated into the housing.

8. The apparatus claim 1, wherein:
   during operation, the LED string has a higher voltage end and a lower-voltage end.

9. The apparatus of claim 1, wherein the second LED string is powered by an inductive coupling to the first LED string.

10. The apparatus of claim 9, wherein:
    the first LED string has a first spectral content and the second LED string has a second spectral content different from the first spectral content of the first LED string; and
    circuitry of the apparatus is configured so that changes to the electrical current in the first LED string caused by the current controller changes an electrical current in the second LED string so as to change a mix of the first and second spectral contents output by the apparatus.

11. The apparatus of claim 10, wherein the change of the mix includes a change in near-red output and far-red output.

12. The apparatus of claim 1, wherein the first LED string includes an inductive winding in electrical series with the first plurality of LED packages, the apparatus further comprising one or more electrical loads inductively coupled to the inductive winding so as to power the one or more electrical loads.

13. The apparatus of claim 12, wherein the one or more electrical loads comprises at least one of a second LED string, a control circuit, an energy storage device, and a radio.

14. The apparatus of claim 12, wherein the one or more electrical loads includes a second LED string, a dimmer circuit, and a wired or wireless housekeeping control circuit.

15. The apparatus of claim 1, wherein the apparatus is configured to illuminate one or more plants.

16. The apparatus of claim 1, further comprising a radio configured to wirelessly communicate with a remote controller.

\* \* \* \* \*